Figure 1:
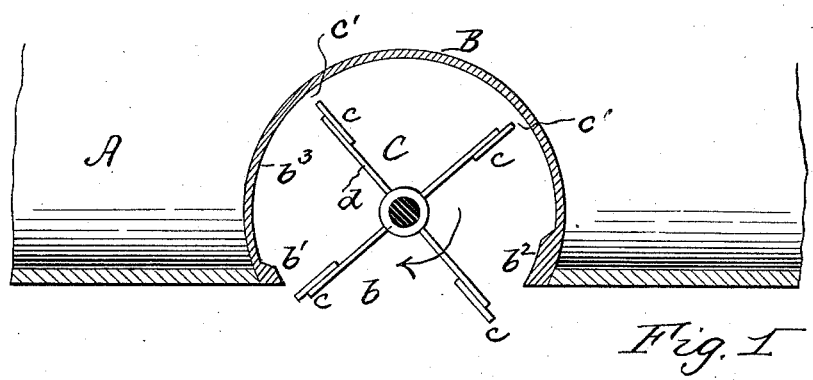

(No Model.)

W. H. WIGMORE.
PADDLE WHEEL FOR VESSELS.

No. 431,096. Patented July 1, 1890.

WITNESSES:

INVENTOR,
Wm. H. Wigmore
By S. J. Van Stavoren
Attorney

UNITED STATES PATENT OFFICE.

WILLIAM H. WIGMORE, OF PHILADELPHIA, PENNSYLVANIA.

PADDLE-WHEEL FOR VESSELS.

SPECIFICATION forming part of Letters Patent No. 431,096, dated July 1, 1890.

Application filed May 10, 1889. Serial No. 310,338. (No model.)

*To all whom it may concern:*

Be it known that I, WILLIAM H. WIGMORE, a citizen of the United States, residing at Philadelphia, in the county of Philadelphia and State of Pennsylvania, have invented certain new and useful Improvements in Ships' Propellers; and I do hereby declare the following to be a full, clear, and exact description of the invention, such as will enable others skilled in the art to which it appertains to make and use the same.

My invention has relation to that form of ships' propellers or wheels which revolve in air-tight cylindrical casings or drums located on each side of the keel intermediate of its ends, as shown, described, and claimed in United States Letters Patent, dated January 19, 1886, No. 334,632. In this patent the paddle-wheels snugly fit the air-tight casings, which are of one or the same diameter throughout, in order to prevent the up movement of the blades carrying water into the casing beyond the diameter of the wheel and, also, to cause said casing to assist the downward movement of the blades in expelling water from the casing. While with said construction such described results are obtained, yet in practice it has been found that as the blades enter the casing and revolve in it the water adhering to the blades is, by centrifugal force, thrown to their outer edges, and as there is no appreciable clearance between the edges of the blades and the casing such water dams up or accumulates in ripples or ridges at said edges and revolves with the blades in impingement against the casing-wall and produces undue friction on the blades, resulting in a loss of speed and a needless consumption of power. Again, as there is no clearance between the blades and the casing the blades as they revolve through the latter carry with them the air in the top of the casing to mix it with the water in the bottom of the casing and produce a churning of such air and water, besides taking from the top of the casing the air that should remain there, all of which is detrimental to the efficiency of action of the wheels.

My invention has for its object to avoid these described objections, and to this end I make the wheel snugly fit the mouth or entrance of the casing for the purposes of preventing the wheel carrying water into the casing beyond the edge of its blades or diameter and of expelling water from the casing, as above described; but beyond the casing-mouth its interior diameter or size in cross-section is enlarged to provide ample clearance between the casing and the wheel for the escape of water and air from the outer edge of the blades.

My invention accordingly consists of the combinations, constructions, and arrangements of parts, as hereinafter more particularly described in this specification, and pointed out in the claims, reference being had to the accompanying drawings, wherein—

Figure 2:
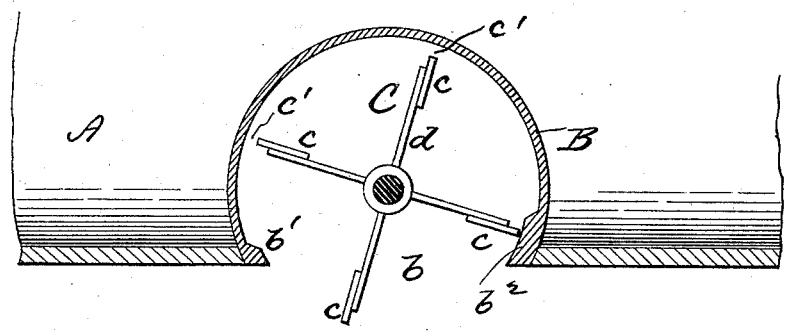
Figure 3:

Figures 1 and 2 are sectional elevations of part of a ship's hull with paddle-wheel and air-tight casing embodying my improvements, and showing the wheel in two different positions; and Fig. 3 is a section showing oval form of paddle or blade-arms.

A indicates the ship's hull, B the air-tight cylindrical casing, and C the propeller or paddle wheel, which, as shown, has four blades $c$; but it may be otherwise constructed, as desired.

The mouth or entrance $b$ of the casing is of a radius nearly equal to that of the wheel C, so that the blades of the latter make a snug fit therewith as they revolve through said mouth, as indicated more plainly in Fig. 2, and this radius of the mouth $b$ is continued within the casing for a short distance on both sides and for a longer distance on the other side of the casing to form abutments $b'$ and $b^2$. The abutment $b'$ is at that side of the mouth on the up stroke or movement of the blades and the abutment $b^2$ on the opposite side, whereat the blades make their down stroke or movement. If desired, the abutment $b^2$ may be made longer than the abutment $b'$, as indicated in the drawings, for a purpose hereinafter explained. Beyond these abutments the diameter of the casing or its size in cross-section is enlarged or made bigger than the diameter of the wheel, as indicated at $b^3$, to provide a clearance or space $c'$ between the outer edges of the blades $c$ and the wall of casing B. The provision of the clearance or space $c'$ admits of the water adhering to the blades as they rise in and pass through the casing B to be thrown by centrifugal force from the outer edge of the blades to the casing-wall, and then drops to the bottom of the casing without interfering with or obstructing the movement of the blades in the casing. For the same reason the air escapes or flies from the ends or edges of the paddles and remains in the top of the casing, and churning of air and water in the bottom of the casing is avoided. As the water and air are free to escape from the blades, the latter freely revolve through the casing or without being subject to friction from such water and air, and hence the speed of the wheel is not retarded and needless consumption of power is avoided. The abutment $b'$ prevents the blades $c$ taking water into the casing beyond the diameter of the wheel, and the abutment $b^2$ assists the blades in expelling water from the casing, and by making this abutment $b^2$ of a long length, as indicated in the drawings, such assistance is materially increased.

The side arms $d$ for the paddles or blades are made of a sharp oval in cross-section, as shown in Fig. 3, so that they will move more easily through the water, and the blades are preferably fastened to the arms by countersunk screws, with their slots suitably filled or calked, so as to avoid all recesses or projections on the wheel or its parts in or about which air could collect, and thus prevent the wheel carrying air down from the casing into the water, it being especially desirable to maintain a given air volume or pressure in the casing in order that the water cannot rise therein above a certain or given height to interfere with the efficiency of the wheel.

From the foregoing it will be noted that the wheel-casing is so constructed that its mouth or entrance makes a close or snug fit with that part of the wheel revolving through said mouth, and that the interior diameter or size in cross-section is larger than the diameter of the wheel, and is of a different radius from that for the mouth, in order to obtain the necessary clearance between the wheel and casing. I therefore do not limit myself to any construction of interior diameter of the casing, as it is obvious that it may be variously formed to make it of a larger diameter or size than that of the wheel, and of a diameter or size different from that of the mouth of the casing to secure the two functions of, first, preventing the water beyond the edge of the wheel passing into the casing, and, second, providing ample clearance between the wheel-blades and casing to prevent the formation of ripples or ridges between the casing and the edge of the wheel-blades.

I do not herein broadly claim the wheel-casing having different concentric diameters, nor a wheel-casing having a mouth which approximates the chord of the wheel or propeller and an interior diameter larger than that of the wheel or propeller for the purposes herein described, as I reserve the same for the subject-matter of another separate application; but

What I claim is—

1. In a ship's hull, an air-tight wheel-casing B, having a mouth $b$ of one diameter, abutments $b'$ $b^2$ at each end of said mouth, and an interior diameter larger than that of its mouth, substantially as set forth.

2. In a ship's hull, an air-tight wheel-casing B, having mouth $b$ and long and short abutments $b'$ and $b^2$ at the ends of said mouth, substantially as and for the purpose set forth.

3. In a vessel, an air-tight wheel-case B, having a mouth $b$, in combination with a paddle-wheel C, and abutments $b'$ $b^2$ at each end of the mouth $b$, substantially as set forth.

In testimony whereof I affix my signature in presence of two witnesses.

WILLIAM H. WIGMORE.

Witnesses:
S. J. VAN STAVOREN,
CHAS. F. VAN HORN.